(12) United States Patent
Johnson

(10) Patent No.: US 9,655,473 B2
(45) Date of Patent: May 23, 2017

(54) COVER ASSEMBLY FOR COOKING VESSEL

(71) Applicant: Ron Tyler Johnson, Oklahoma City, OK (US)

(72) Inventor: Ron Tyler Johnson, Oklahoma City, OK (US)

( * ) Notice: Subject to any disclaimer, the term of this patent is extended or adjusted under 35 U.S.C. 154(b) by 475 days.

(21) Appl. No.: 14/328,376

(22) Filed: Jul. 10, 2014

(65) Prior Publication Data

US 2015/0014326 A1 Jan. 15, 2015

Related U.S. Application Data

(60) Provisional application No. 61/844,692, filed on Jul. 10, 2013.

(51) Int. Cl.
| | |
|---|---|
| *A47J 37/12* | (2006.01) |
| *A47J 36/06* | (2006.01) |
| *A47J 37/04* | (2006.01) |
| *A47J 37/07* | (2006.01) |

(52) U.S. Cl.
CPC ........... *A47J 37/128* (2013.01); *A47J 36/06* (2013.01); *A47J 37/049* (2013.01); *A47J 2037/0795* (2013.01)

(58) Field of Classification Search
CPC ........ A47J 37/128; A47J 37/049; A47J 36/06; A47J 2037/0795
USPC ........... 99/403, 407, 410, 414, 415; 452/185
See application file for complete search history.

(56) References Cited

U.S. PATENT DOCUMENTS

| | | | | |
|---|---|---|---|---|
| 53,421 | A * | 3/1866 | Dembois | A47J 27/58 |
| | | | | 126/384.1 |
| 122,407 | A * | 1/1872 | Russell | A47J 37/1219 |
| | | | | 99/414 |
| 642,250 | A * | 1/1900 | Nerbovig | B65D 51/1683 |
| | | | | 220/231 |
| 1,766,797 | A | 6/1930 | Nakagawa | |
| 3,635,722 | A * | 1/1972 | Moore | A23L 5/11 |
| | | | | 426/438 |
| 5,033,453 | A * | 7/1991 | Loyd | A47J 27/58 |
| | | | | 126/377.1 |
| 7,044,049 | B2 | 5/2006 | Johnston, Sr. et al. | |
| 7,316,180 | B2 | 1/2008 | Williams | |
| 8,375,847 | B1 | 2/2013 | Anganes | |
| 8,850,965 | B2 * | 10/2014 | Popeil | A47J 37/1209 |
| | | | | 426/438 |
| 8,939,068 | B2 * | 1/2015 | Cohen | A23B 4/044 |
| | | | | 340/501 |
| 9,016,190 | B2 * | 4/2015 | Webb | A47J 37/1204 |
| | | | | 99/418 |
| 2003/0136272 | A1* | 7/2003 | Brown | A47J 27/10 |
| | | | | 99/483 |

(Continued)

*Primary Examiner* — Omar Flores Sanchez
(74) *Attorney, Agent, or Firm* — Dunlap Codding, P.C.

(57) ABSTRACT

A cover assembly for a cooking vessel including a seal member, a lid, and a food support assembly. The seal member has a clip portion with a lid receiving channel and an overflow channel. The lid has a top end and a sidewall defining an internal lid space. A lower end of the sidewall is receivable in the lid receiving channel of the seal member. The food support assembly is connected to the sidewall and is operable between a raised position wherein a food item may be supported within the internal lid space and a lowered position wherein the food item may be supported below the seal member in the cooking vessel.

17 Claims, 6 Drawing Sheets

(56) References Cited

U.S. PATENT DOCUMENTS

| | | | |
|---|---|---|---|
| 2004/0163547 A1* | 8/2004 | Kijimoto | A47J 37/128 |
| | | | 99/330 |
| 2006/0027575 A1 | 2/2006 | Lombardo et al. | |
| 2006/0272633 A1 | 12/2006 | Osias, Jr. | |
| 2010/0101431 A1 | 4/2010 | Myshrall | |
| 2010/0288138 A1 | 11/2010 | Fiorino et al. | |
| 2011/0142998 A1* | 6/2011 | Johncock | A47J 37/041 |
| | | | 426/233 |

* cited by examiner

US 9,655,473 B2

COVER ASSEMBLY FOR COOKING VESSEL

CROSS-REFERENCE TO RELATED APPLICATIONS

This application claims priority to U.S. Provisional Application Ser. No. 61/844,692, filed on Jul. 10, 2013, the entire content of which is hereby expressly incorporated herein by reference.

BACKGROUND

Deep fryers, such as turkey fryers, are widely used in the United States. They often include a 20-to-30 quart vessel for holding the cooking oil and the food item to be fried, as well as a heat source, such as a propane heater or an electric heater, to heat the cooking oil to a desired temperature. The vessel is typically supported by a stand or a base into which the heat source is usually incorporated. While some deep fryers use electrical heaters, most deep fryers used to cook turkeys in the United States use propane or natural gas burners to heat the cooking oil. A turkey holder is inserted into the cavity of the turkey to be fried is inserted into a basket or placed on a rack. A handle is attached to the turkey holder such that the turkey can be manually lowered into the hot cooking oil. Once the turkey is cooked, the user removes the turkey by grasping the handle attached to the turkey holder and lifting the holder and turkey from the hot oil.

Deep fryers, while pervasive, can be dangerous to the user. Multiple fires and burns are caused annually by their use because of the defects present in many existing designs. For example, commonly used deep fryers have metal cooking vessels with metal handles. The vessels and handles become very hot during use and may cause serious burns to anyone coming in contact with their surfaces. Another significant disadvantage of existing deep fryers is the relatively tall and relatively narrow burner bases frequently used. The tall and narrow base design has a relatively high-center of gravity, making them prone to tipping over, thereby splashing or spilling hot cooking oil on the heat source or on a user. In the case of propane burners, such splashed cooking oil may be ignited by the propane burner. Because of the quantity of cooking oil (e.g., 30 quarts or more), large fires may quickly ensue.

The open flame design presents other issues. Burners as currently designed allow the flame to spread out and around the sides of the cooking vessel. This is inefficient and requires more fuel to heat the cooking oil to the desired temperature.

Cooking oils can be safely heated to a certain auto-ignition temperature which varies for different oils (e.g., above 400° F.). Heating the oil above its particular auto-ignition temperature causes the oil to spontaneously ignite in the cooking vessel. Existing deep fryers often lack thermostats or other means to ensure that the temperature of the oil is prevented from reaching the auto-ignition temperature, such as by automatically shutting off the burner when the auto-ignition temperature is approached.

By far the most dangerous aspect of using existing deep fryers, however, is encountered when the user stands over the deep fryer in order to manually lower a relatively large and often heavy turkey into the hot cooking oil. Turkeys are frequently purchased frozen and subsequently thawed out, dried, and/or seasoned prior to being fried. In certain cases where the turkey has not been completely thawed, or where moisture or water remains on the turkey or in its cavity, a sudden vigorous boiling and splashing of the hot oil may occur when the turkey is being placed into the deep fryer. As another example, users often overfill the vessel with cooking oil and do not allow sufficient remaining space in the vessel for the oil that is displaced by the turkey when the turkey is lowered into the cooking vessel. Cooking oil also expands when heated, and a surprisingly large volume of oil is displaced by the turkey when the turkey is inserted into the hot oil. Both the heat expansion of the oil and the volume of oil displaced by the turkey frequently result in hot oil overflowing or spilling out of the cooking vessel when the turkey is lowered into the oil.

The sudden splashing or spilling of hot oil may cause the user to drop the turkey into the deep fryer, rather than lowering it into the vessel in a controlled manner, thus further increasing the splashing and boiling over of the hot oil, or even tipping the fryer over. Lowering the turkey into the cooking oil is so dangerous that many turkey fryers are accompanied by express instructions to turn off the burner during this step. Unfortunately, these instructions are often either ignored or not read by users. The existing lack of features to prevent this potential splashing and spilling over of hot oil results in multiple user burns and injuries, and in significant property damage and fires annually.

Finally, existing turkey fryers may have relatively short gas-supply conduits connecting them to a fuel gas source, such as a pressurized container. Because of its proximity, the fuel gas source may easily be splashed or otherwise come into contact with ignited cooking oil, further increasing the danger to users.

BRIEF DESCRIPTION OF THE DRAWINGS

Like reference numerals in the figures represent and refer to the same or similar element or function. Implementations of the inventive concepts disclosed herein may be better understood by referring to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
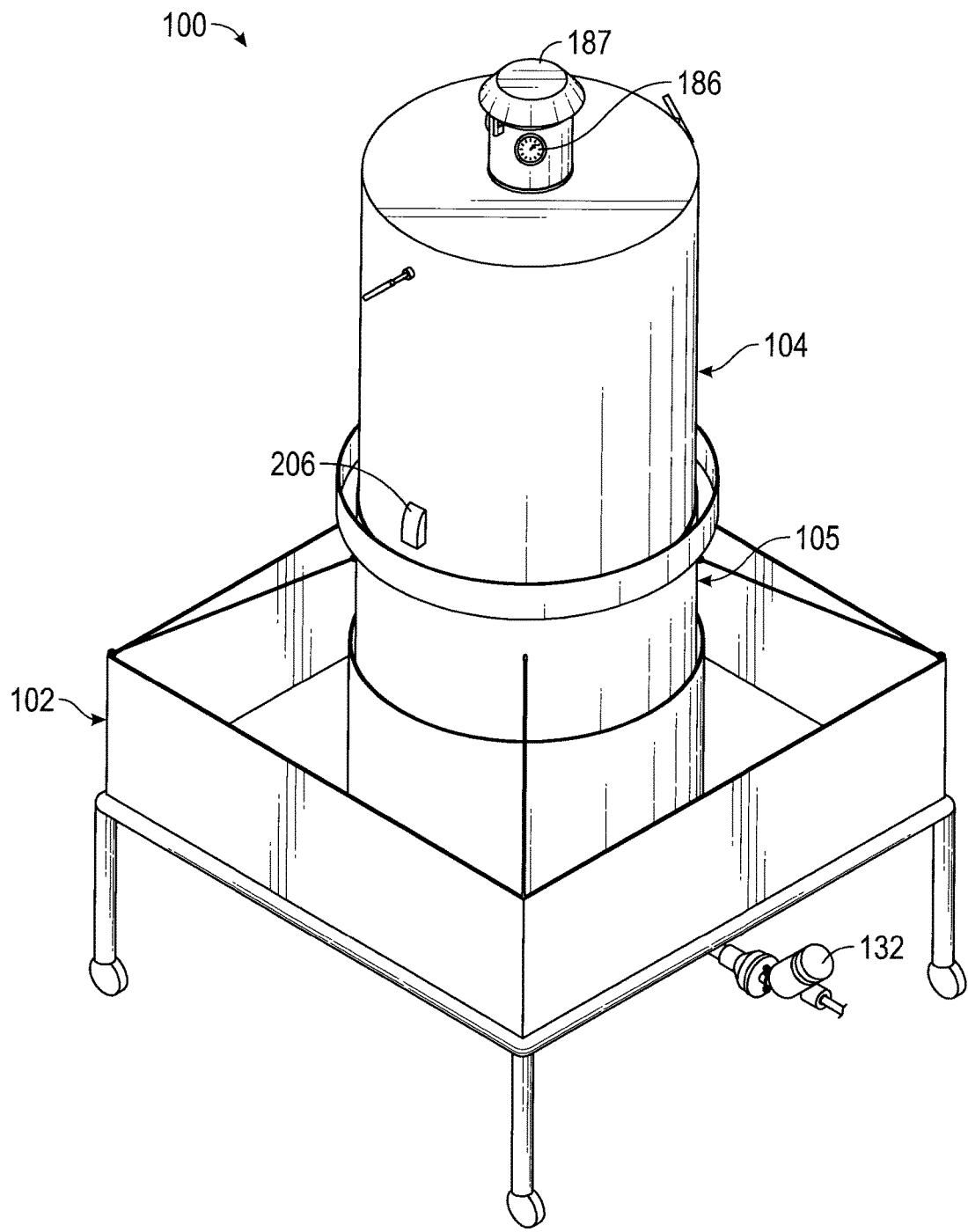
FIG. 1 is a perspective view of an embodiment of a frying apparatus constructed in accordance with the inventive concepts disclosed herein.

Before explaining at least one embodiment of the inventive concepts disclosed herein in detail, it is to be understood that the inventive concepts disclosed herein are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way.

In the following detailed description of embodiments of the inventive concepts, numerous specific details are set forth in order to provide a more thorough understanding. However, it will be apparent to one of ordinary skill in the art that the inventive concepts within the disclosure may be practiced without these specific details. In other instances, well-known features may not be described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 100a-n). Similarly, a letter following a reference numeral is intended to reference an embodiment of the feature or element that may be similar, but not necessarily identical, to a previously described element or feature bearing the same reference numeral (e.g., 100, 100a, 100b, etc.). Such shorthand notations are used for purposes of clarity and convenience only, and should not be construed to limit the instant inventive concepts in any way, unless expressly stated to the contrary.

Further, unless expressly stated to the contrary, "or" refers to an inclusive "or" and not to an exclusive "or." For example, a condition A or B is satisfied by anyone of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein, any reference to "one embodiment" or "an embodiment" means that a particular element, feature, structure, or characteristic described in connection with the embodiment is included in at least one embodiment. The appearances of the phrase "in one embodiment" in various places in the specification are not all necessarily referring to the same embodiment.

The inventive concepts disclosed herein are generally directed to a frying apparatus for deep frying food items, and more particularly, but not by way of limitation, to a frying apparatus configured to safely deep fry fowl or birds, such as turkeys.

Referring now to FIG. 1, shown therein is an exemplary embodiment of a frying apparatus 100 constructed in accordance with the inventive concepts disclosed herein. The frying apparatus 100 includes a stand assembly 102 and a cover assembly 104 for use with a cooking vessel 105. The stand assembly 102 and the cover assembly 104 may be associated with one another as shown in FIG. 1, to assemble the frying apparatus 100 according to the inventive concepts disclosed herein. As will be appreciated by persons of ordinary skill in the art having the benefit of the instant disclosure, in some embodiments, the stand assembly 102, the cover assembly 104, and/or one or more components thereof may be provided as a kit, and/or the stand assembly 102, the cover assembly 104, and/or one or more components thereof may be used to retrofit an existing frying apparatus so as to provide one or more features as will be described below. The frying apparatus 100 may be configured to cook any desired food item, such as a fowl or a bird, including turkeys, chickens, ducks, and the like, and/or any other desired food item, by partially or substantially completely submerging the food item in heated cooking oil inside the cover assembly 104.

Figure 2:
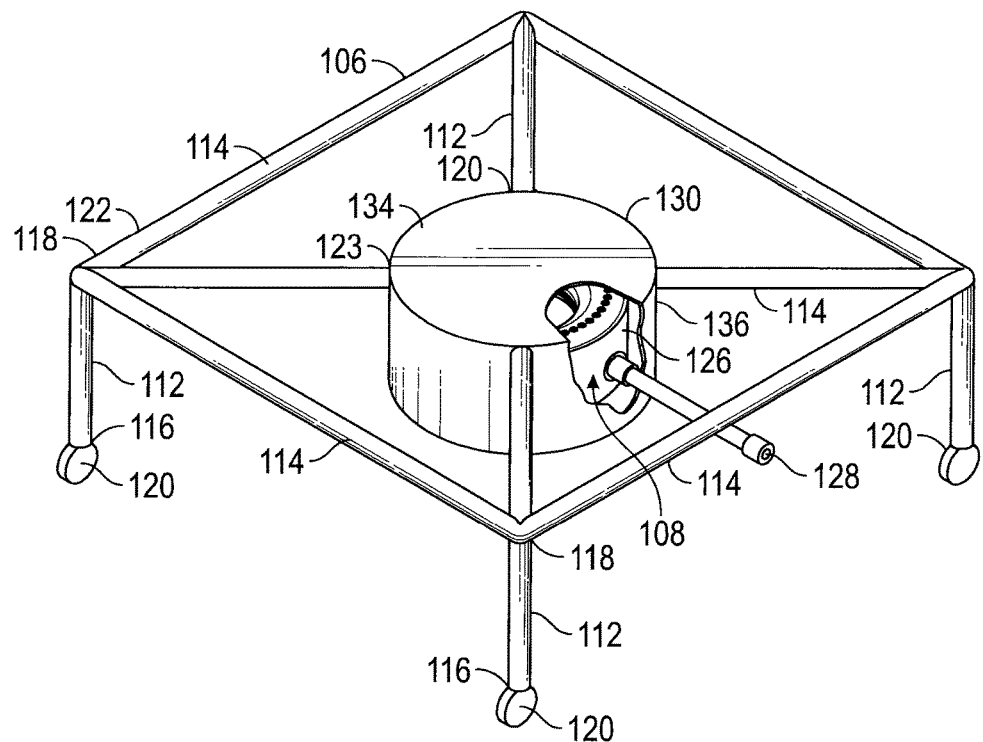
FIG. 2 is a partially cutaway, perspective view of a base constructed in accordance with the inventive concepts disclosed herein.
Figure 3:
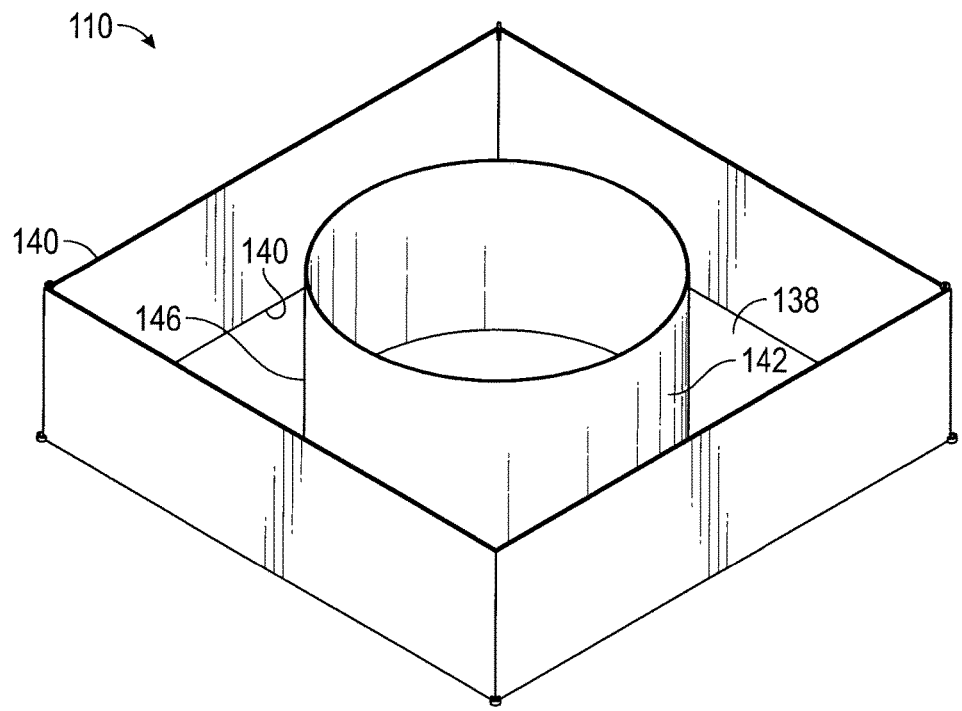
FIG. 3 is a perspective view of a pan constructed in accordance with the inventive concepts disclosed herein.

Referring now to FIGS. 2-3, the stand assembly 102 may include a base 106, a burner assembly 108, and a pan 110. The base 106 has a plurality of vertical support members 112 and a plurality of horizontal support members 114 associated with the vertical support members 112. In the exemplary embodiment shown in FIG. 2, the base 106 is shown as being substantially square, and as having four vertical support members 112, and ten horizontal support members 114, but it is to be understood that the base 106 may have any desired shape, such as circular, oval, triangular, rectangular, polygonal, star-shaped, and combinations thereof, for example. Further, the base 106 may have any desired number of vertical support member 112 and horizontal support members 114 as will be appreciated by a person of ordinary skill in the art having the benefit of the instant disclosure. The base 106 may have any desired dimensions, such as being 6 inches tall, 28 inches long, and/or 24 inches wide in some embodiments.

The vertical support members 112 may have a first end 116 and a second end 118. The first end 116 may be configured to support the base 106 on a surface, such as the ground or any other desired surface. The vertical support members 112 may have any desired length, such as for example a length of about 6 inches. The vertical support members 112 may be implemented as tubular members in some exemplary embodiments, and may be constructed of any desired material, such as metals, alloys, thermoplastics, resins, ceramics, wood, or combinations thereof, for example.

In the exemplary embodiment shown in FIG. 2, a wheel 120, such as a caster or a locking caster, is shown associated with the first end 116 of the vertical support members 112. The locking wheels 120 may be configured to allow the base to roll when pushed or bumped, substantially preventing the base 106 from tipping over. It is to be understood that the locking wheels 120 are optional, and may be omitted in some exemplary embodiments of the inventive concepts disclosed herein. Further, in some exemplary embodiments, the locking wheels 120 may be locked by a user to prevent the base 106 from rolling, such as when the base 106 is placed on an uneven or inclined surface, for example.

The horizontal support members 114 may be implemented similarly to the vertical support members 112, and may have a first end 122 associated with the second end 118 of the vertical support members 112, and/or with one or more first ends of another horizontal support member 114, for example, and a second end 123 associated with the burner assembly 108 as will be described below. The horizontal support members 114 may be associated with the vertical support members 112 in any desired manner, such as via welds, joints, seams, fasteners, brackets, clamps, adhesives, and combinations thereof. Further, in some exemplary embodiments, the horizontal support members 114 and the vertical support members 112 may be implemented as a unitary component.

The horizontal support members 114 may function to support the burner assembly 108 and the pan 110. As will be appreciated by persons of ordinary skill in the art, any desired number of configurations of horizontal support members 114 may be implemented with the inventive concepts disclosed herein, and in some embodiments the horizontal support members 114 may be omitted, and the burner assembly 108 and the pan 110 may be supported by the vertical support members 112.

The burner assembly 108 includes a burner 126, a gas conduit 128, and a burner plate 130. The burner assembly 108 may be implemented as a 45,000 BTU propane burning unit in some exemplary embodiments, or in any other desired manner. The burner 126 may be implemented as any desired burner configured to burn any suitable fuel or fuel gas (e.g., propane, gasoline, or natural gas) to generate heat, for example. The burner 126 may be supported by one or more of the horizontal support members 114, and may be substantially centered relative to the base 106.

The gas conduit 128 is fluidly coupled with the burner 126 and is configured to be fluidly coupled with any suitable fuel source (not shown) such as a gas line or a pressurized gas tank or container, for example. An optional valve 132 (FIG. 1) may be operatively coupled with the gas conduit 128 and may be configured to selectively allow, discontinue, and incrementally control a flow of fuel to the burner 126 as will be described below. The valve 132 may be implemented as a regulator configured to control the flow of gas through the gas conduit 128. Further, the gas conduit may be fluidly coupled with a fuel gas source via a 10-foot gas line, desirably via one or more metal connectors. In some exemplary embodiments, the valve 132 may be configured to shut off the flow of fuel gas to the burner 126 when the temperature measured by a temperature sensor of the cover assembly 104 reaches a preset level (e.g., 350° F.). Further, the valve 132 may regulate the flame of the burner 126 based on cooking oil temperature (e.g., to keep the temperature substantially constant). Further, in some exemplary embodiments, the valve 132 may be configured to detect leaks (e.g., gas pressure delta) and to shut off the flame of the burner 126 if a leak is detected.

The burner plate 130 may include a surface 134 and may be supported by one or more of the horizontal support members 114 at a distance (e.g., about 3 inches) above the burner 126 so that the surface 134 is substantially centered over the burner 126, and so that the burner 126 and the burner plate 130 are thermally coupled with one another, to allow the burner 126 to supply heat to the burner plate 130, for example. The burner plate 130 may be implemented as a 12 inch round and ¼ inch thick solid plate, and may be constructed of any desired thermally resistant and thermally conductive material, such as metals (e.g., steel or cast iron), alloys, ceramics, and combinations thereof, for example. In some exemplary embodiments, the burner plate 130 may be substantially oval in shape, although the burner plate may have any desired shape, such as being circular, triangular, polygonal, square, rectangular, and combinations thereof.

A wind guard 136 may be associated with the burner plate 130 and may extend substantially downward from the burner plate 130 at a distance (e.g., about 4 inches) so as to at least partially, or substantially completely span the distance between the burner plate 130 and the burner 126. The wind guard 136 may be configured to shield, guard, or otherwise protect the burner 126 from wind (e.g., by substantially completely or at least partially enclosing the burner 126). The wind guard 136 may be constructed of a similar material to the burner plate 130, and in some exemplary embodiments, the wind guard 136 and the burner plate 130 may be formed as a unitary component. Further, in some embodiments, the wind guard 136 may be omitted.

As will be appreciated by persons of ordinary skill in the art having the benefit of the instant disclosure, a burner assembly 108, according to the inventive concepts disclosed herein, may be energy efficient due to the relationship between the burner 126, the burner plate 130, and the wind guard 136, which may be configured to capture, trap, or otherwise retain or concentrate the majority or most of the heat energy generated by the burner 126 at the burner plate 130.

While the burner assembly 108 has been shown and described as a gas fuel burner assembly 108, in some exemplary embodiments of the inventive concepts disclosed herein, the burner assembly 108 may be implemented as an electrical burner assembly, or as an inductive burner assembly 108, and combinations thereof, for example.

Referring now to FIG. 3, the pan 110 has a bottom 138, a sidewall 140, and a cooking vessel base 142. The bottom 138 may be supported by the horizontal support members 114 of the base, and may be associated with the horizontal support members 114 in any desired manner, such as via welds, seams, joints, shims, brackets, bolts, screws, adhesives, and combinations thereof. In some exemplary embodiments, the bottom 138 and the horizontal support member 114 may be formed as a unitary component, while in some exemplary embodiments the horizontal support members 114 may be omitted, and the bottom 138 may be supported by the vertical support members 112. The bottom 138 may be constructed of any desired heat-resistant and thermally conductive material, such as metals, alloys, ceramics, and combinations thereof, for example. The bottom 138 may be supported by the surface 134 of the burner plate 130, may come into contact with the surface 134, or may be otherwise thermally coupled with the surface 134 and/or with the burner plate 130. Further, in some exemplary embodiments, the burner plate 130 and the bottom 138 may be formed as a unitary component.

The sidewall 140 extends upward a distance (e.g., about 6 inches) from the bottom 138 and may cooperate with the bottom so as to define a closed lower end 144 configured to contain any spilled or splashed fluids (e.g., cooking oil) and to prevent fluids (e.g., cooking oil) from contacting the burner 126. The sidewall 140 may have any desired height (e.g., about 6 inches), and may be connected with the bottom 138 in any desired fluidly impermeable manner. Further, in some embodiments, the sidewall 140 and the bottom 138 may be formed as a unitary component. The closed lower end 144 may define a volume, which may be at least equal to, or larger than a volume of a cooking vessel of the cover assembly 104 such that the closed lower end 144 may contain substantially the entire volume of oil that may spill from the cover assembly 104.

The cooking vessel base 142 may extend from the bottom 138, inside the sidewall 140, and may be substantially centered over the burner plate 130 so as to be thermally coupled with the burner plate 130. The cooking vessel base 142 may have a wall 146 extending a distance from the bottom 138 and may be configured to matingly receive at least a portion of the cover assembly 104 therein, for example, and to house and stabilize at least a portion of the cover assembly 104. In an exemplary embodiment, the cooking vessel base 142 may be implemented as an 18 inch long by 14 inch wide by 10 inch tall centered oval ring configured to matingly receive the cover assembly 104 therein. It is to be understood that in some exemplary embodiments, the cooking vessel base 142 and the bottom 138 may be formed as a unitary component, while in some exemplary embodiments the cooking vessel base 142 may be omitted.

Referring now to FIGS. 4-8, the cover assembly 104 for use with a cooking vessel may include a seal member 152, a lid 154, and a food item support assembly 156. It should be appreciated that the cover assembly 104 may be used with a variety of different types of cooking vessels. However, for the sake of the instant disclosure, the cover assembly 104 will be described as being used with the cooking vessel 105.

Figure 5:
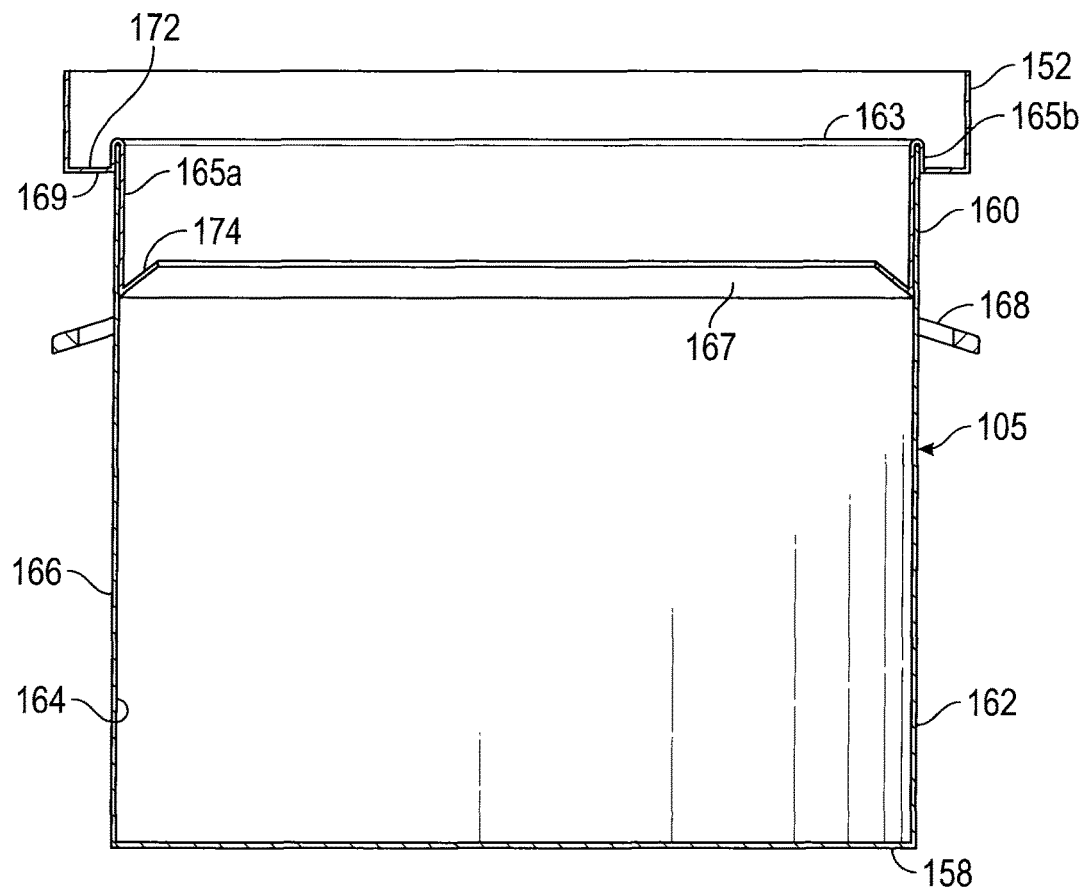
FIG. 5 is a cross-sectional view of a seal member of the cover assembly shown positioned on the cooking vessel.

The cooking vessel 105 may have a closed first end 158 configured to be matingly received in the cooking vessel base 142 so that the closed first end 158 is thermally coupled with the burner plate 130, an upper rim 160, and a sidewall 162 extending between the first end 158 and the upper rim 160 and having an internal surface 164 and an external surface 166 (FIG. 5). In some exemplary embodiments, the cooking vessel 105 may be implemented as an oval shaped stainless steel cooking vessel and may be sized 18 inches long, 14 inches wide, and 14 tall, and may have a volume of about 48 quarts.

Any desired fill depth, such as a fill depth of about 6 inches or about 8 inches may be marked on the cooking vessel 105 to assist users in determining how much oil to provide inside the cooking vessel 105. Further, in some exemplary embodiments, the cooking vessel 105 may be implemented as a 16 inch long by 14 inch wide by 14 inch tall cooking vessel with a volume of about 42 quarts, and may have a fill depth of 6 inches (e.g., about 4.4 gallons of oil) or a fill depth of 8 inches (e.g., about 6.3 gallons of oil). In an exemplary embodiment, the cooking vessel 105 may be implemented as a 15 inch long by 12 inch wide by 14 inch tall cooking vessel having a volume of about 30 quarts, and may have a fill depth of about 6 inches (e.g., about 3.7 gallons of oil) and/or a fill depth of about 8 inches (e.g., about 5.2 gallons of oil). As will be appreciated by persons of ordinary skill in the art, the cooking vessel 105 may have any desired size, shape, volume, and fill depths.

Further, in some exemplary embodiments, the cooking vessel 105 may include one or more handles 168 which may be constructed of a heat-resistant thermoplastic material and may be configured so as to minimize heat transfer from the cooking vessel 105 to a user holding the handles 168. The handles 168 may be associated with the cooking vessel 105 in any desired manner, such as via one or more fittings, hinges, adhesives, fasteners, or combinations thereof, for example.

Figure 7:
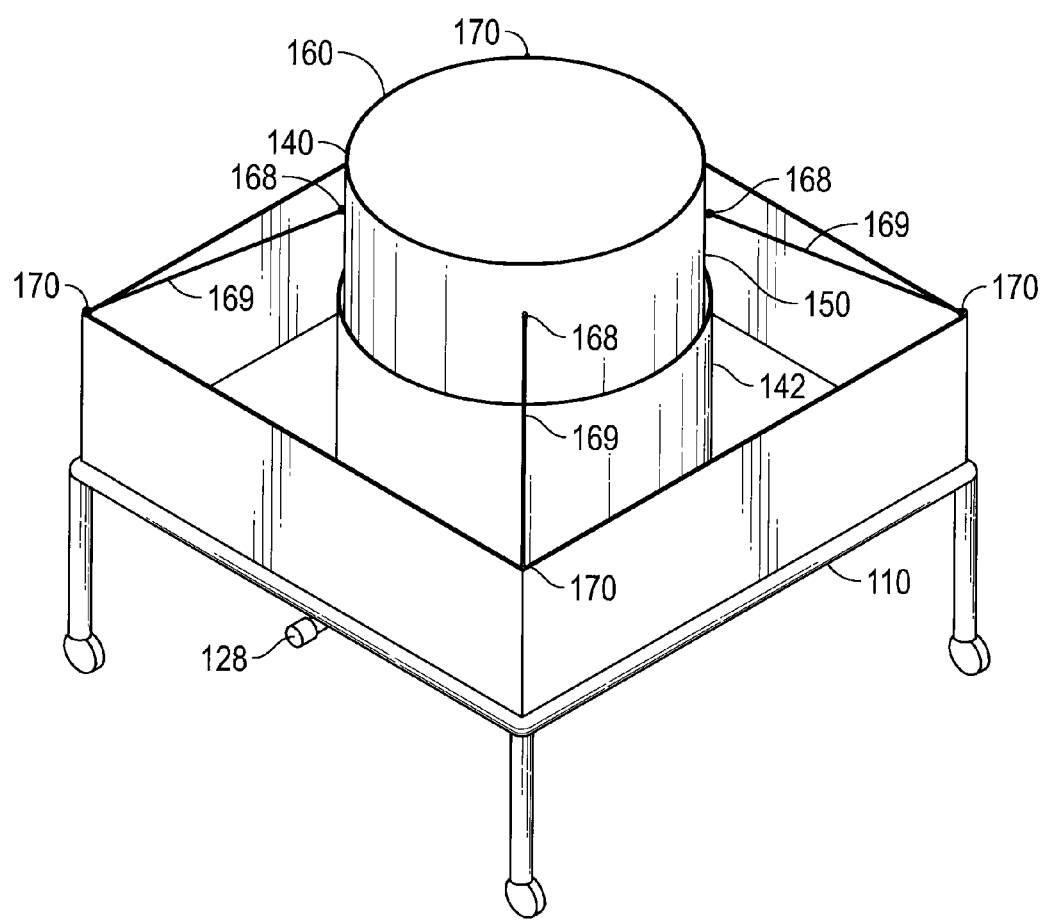
FIG. 7 is a perspective view of the cooking vessel shown associated with the base assembly according to the inventive concepts disclosed herein.

As shown in FIG. 7, in some embodiments, one or more (e.g., two, three, four, five, or more) adjustable and/or locking connectors 169 (e.g., metal wires or steel cables) may be connected with the handles 168 and with one or more attachment points 170 associated with or formed in the sidewall 140 of the pan 110, so as to securely connect the cooking vessel 105 and the pan 110 together. It is to be understood that in some exemplary embodiments, the attachment points 170 may be associated with the bottom 138 of the pan 110 and/or with one or more of the horizontal support members 114 and/or the vertical support members 112.

Figure 6:
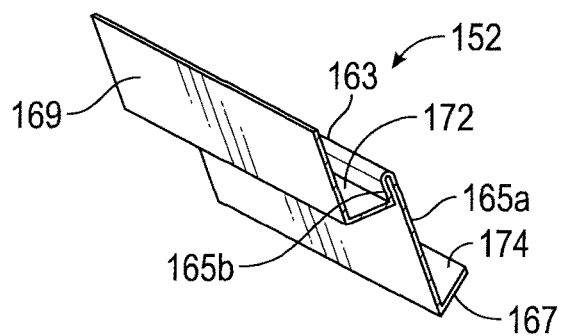
FIG. 6 is a partial cross-sectional view of the seal member constructed in accordance with the inventive concepts disclosed herein.

Referring now to FIGS. 5 and 6, the seal member 152 may be associated with the sidewall 162 at the upper rim 160 and may be configured to substantially seal around the sidewall 162. The seal member 152 may include a U-shaped clip portion 163 with an internal leg 165a and an external leg 165b arranged so that the clip portion 163 is positionable over the upper rim 160 of the cooking vessel 105. The seal member 152 further may further have a shoulder 167 extending from the internal leg 165a of the clip portion 163 so as to define a lid receiving channel 174 and an L-shaped lip 169 extending from the external leg 165b to define an overflow channel 172.

The overflow channel 172 (e.g., about two inches wide and about two inches deep) extending outside the sidewall 162 a first distance from the upper rim 160 towards the first end 158, and a lid receiving channel 174 positioned substantially inside the sidewall 162 and extending a second distance (e.g., about three inches) from the upper rim 160 towards the first end 158. In some exemplary embodiments, the first distance may be greater than, smaller than, or substantially equal to the second distance. As will be appreciated by persons of ordinary skill in the art, the seal member 152 may be configured as a secondary oil-containment feature, in addition to the pan 110.

The overflow channel 172 is configured to extend below the lid 154 when the lid 154 is associated with the seal ring 152, and to catch any fluids (e.g., cooking oil, steam, or condensate water) that may leak out of the cooking vessel 105 and/or the lid 154. The overflow channel 172 may sit against or extend adjacent to the external surface 166 of the sidewall 162, and/or may extend laterally away from the sidewall 162 in some exemplary embodiments.

The lid receiving channel 174 is configured to matingly receive a portion of the lid 154, as will be described below. The lid receiving channel 174 may sit against or adjacent to the internal surface 164 of the sidewall 162, and/or may extend laterally relative to the internal surface 164 of the sidewall 162 in some embodiments.

It is to be understood that in some exemplary embodiments, the seal member 152 and the cooking vessel 105 may be formed as a unitary component.

Figure 4:
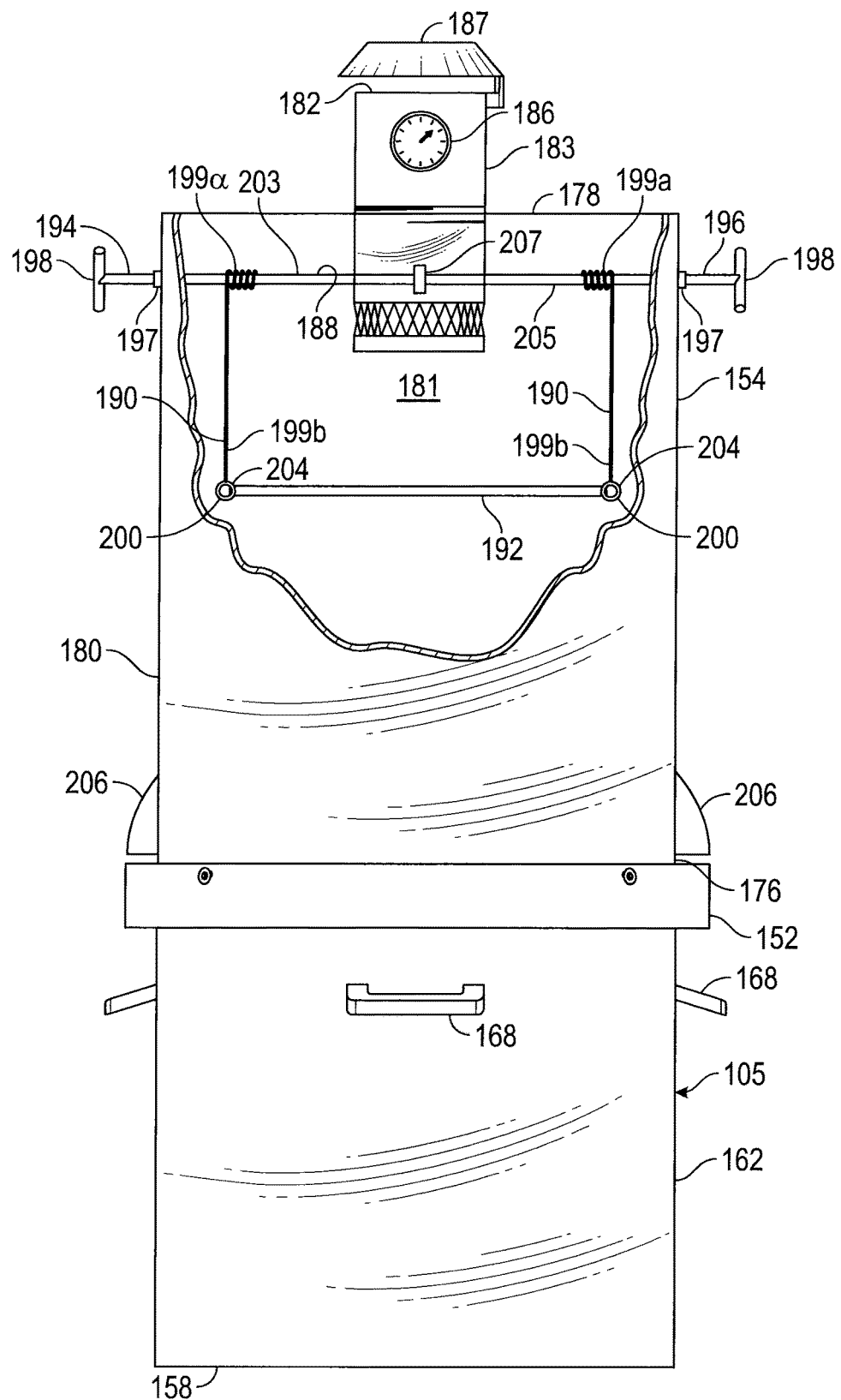
FIG. 4 is a partially cutaway, perspective view of a cover assembly constructed in accordance with the inventive concepts disclosed herein shown positioned on a cooking vessel.
Figure 8:
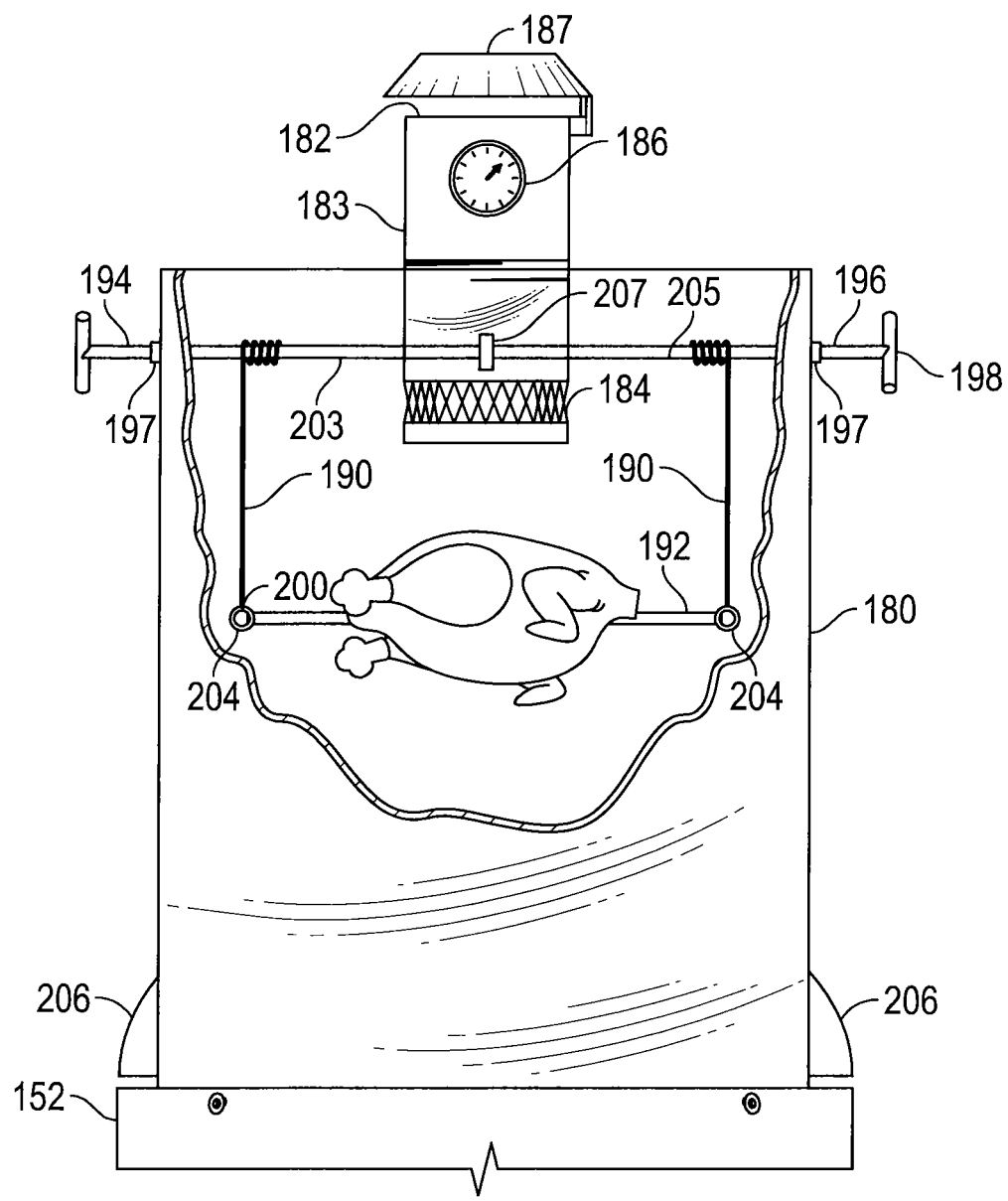
FIG. 8 is a partially cutaway, perspective view of the cover assembly illustrated with a food item supported thereby.

With reference to FIGS. 4 and 8, the lid 154 includes a top end 178, a sidewall 180 extending from the top end 178 to cooperate with the top end 178 to define an internal lid space 181. The lid 154 further has a lower end 176 defining an open bottom end 177. The lid 154 is sized and configured so that the lower end 176 is matingly receivable (e.g., press-fit) in the lid receiving channel 174 of the seal member 152 in a way that the lid 154 extends at least partially below the upper rim 160 of the cooking vessel 105. It is to be understood that in some exemplary embodiments, the lid 154 and the seal member 152 may be formed as a unitary component.

The lid 154 may be constructed of any suitable heat-resistant material such as thermoplastics, for example. In some exemplary embodiments, the lid 154 may be substantially transparent, while in some exemplary embodiments the lid 154 may have one or more transparent portions and one or more opaque portions.

A vent 182 may be formed through the top end 178. The vent 182 may be defined by a tube 183, such as an 8-inch tall by 3-inch round tube. The tube 183 may be provided with one or more splash screens 184 (FIG. 8) and a temperature gauge 186. The vent 182 is configured to vent steam and hot air from the interior of the cover assembly 104, and the splash screen 184 is configured to substantially prevent any cooking oil from splashing out through the vent 182. A cover 187 may be rotatably connected to the tube 183 for selectively covering the vent 182.

The temperature gauge 186 may be implemented as a part of any desired thermometer or temperature sensor, which includes one or more thermal probes or sensors thermally coupled with the interior of the cooking vessel 105 so as to measure the temperature of the cooking oil inside the cooking vessel 105 and to display the temperature to a user in any desirable user-perceivable fashion (e.g., via a visual display, dial, flashing or colored lights, audible signals, or combinations thereof). Further, the temperature gauge 186 is operably coupled with the valve 132 (as shown in FIG. 1) and is configured to provide information (e.g., via one or more signals) indicative of the cooking oil temperature inside the cooking vessel 105 to the valve 132. For example, based on information from the temperature gauge 186, the valve 132 may adjust the amount of fuel gas flowing to the burner 126 so as to maintain any desired temperature (e.g., 350° F.) for the cooking oil inside the cooking vessel 105. Such adjustments may be carried out by the valve 132 continuously, intermittently, or periodically, or combinations thereof.

The food item support assembly 156 may include a support rod 188, one or more cable member 190, and a food item holder 192. The support rod 188 extends at least partially into the lid 154, and may include a first end 194 extending rotatably through the sidewall 180 at a first point and a second end 196 extending rotatably through the sidewall 180 at a second point diametrically opposed to the first point. In some exemplary embodiments, the support rod 188 may extend at least partially through the tube 183 defining the vent 182 and may be at least partially rotatably supported thereby. Heat-resistant handles 198 may be associated with the first end 194 and the second end 196, and may be constructed of any desired material, such as a thermoplastic or other material having a relatively low heat conductivity so as to protect a user's hands from burns, for example.

The support rod 188 may be rotatably associated with the sidewall 180 via any desired mechanism, such as a forward-reverse gearing mechanism 197 configured to allow the support rod 188 to be rotated relative to the sidewall 180 in a controlled manner, such as by a user applying rotational force to the handles 198, and configured to prevent the support rod 188 from rotating when substantially no rotational force is being applied to the handles 198.

The cable members 190 may be associated with the support rod 188 in any desired manner, such that the length of the cable members 190 may be varied by rotating the support rod 188 relative to the sidewall. The cable members 190 may have a first end 199a and a second end 199b with the first end 199a being connected to the support rod 188 in a way that the second end 199b of the cable member 190 may be raised and lowered relative to the support rod 188 in response to rotation of the support rod 188. For example, the second end 199b may be lowered by rotating the support rod 188 in a first direction and may be raised by rotating the support rod 188 in a second direction. The cable members 190 may be constructed from any flexible, heat resistant material such as metal wires or cables, for example. The cable members may be sized so that the maximum length of the cable members 190 is such that the food item is prevented from coming into contact with the first end 158 of the cooking vessel 105 and/or is suspended a distance (e.g., about two inches) above the first end 158 of the cooking vessel 105, to prevent the food item from burning and to enhance cooking oil circulation around the food item.

The cable members 190 may include attachment members 200 on the ends thereof. The attachment members 200 may be configured to attach to the food item holder 192 as will be described below. In some exemplary embodiments, the attachment members 200 may be implemented as hooks or clamps.

The food item holder 192 may be configured to at least partially extend through a food item (e.g., through the cavity of a turkey) and may be connected to the second end 199b of the flexible cable members 190 such that the food item holder 192 may be selectively moved between a raised position (FIG. 8) wherein the food item holder 192 is supported within the internal lid space 181 and a lowered position wherein the food item holder 192 is supported below the seal member 152 so that the food item comes into contact with, or is substantially submerged in, cooking oil. The food item holder 192 may include one or more lateral protrusions (not shown) configured to substantially prevent the food item from rotating relative to the food item holder 192. Further, the food item holder 192 may include one or more attachment points 204 (e.g., circular openings) configured to allow the attachment members 200 to be attached to the food item holder 192.

In some exemplary embodiments, where the food item is a turkey, the food item holder 192 may hold the turkey substantially horizontally with the breast down as shown in FIG. 8. This orientation allows the cooking oil to flow freely through the cavity of the turkey as will be appreciated by persons of ordinary skill in the art having the benefit of the instant disclosure.

In some exemplary embodiments, the support rod 188 may include a first portion 203 and a second portion 205 rotatably connected to one another, such that the first portion 203 and the second portion 205 are rotatable independently of one another. The first portion 203 may be rotatably connected to the second portion 205 with any suitable mechanism, such as a bearing mechanism 207. The first portion 203 and the second portion 205 may be configured to allow a user to suspend a food item at an angle by rotating the first portion 203 to adjust the height of one of the cable members 190 to a first height, and by rotating the second portion 205 to adjust the height of a second one of the cable members 190 to a second height different from the first height. Such arrangement may be implemented to allow for substantially complete drainage of the cooking oil from the food item as will be described below.

In some exemplary embodiments, the lid 154 may include one or more optional heat-resistant handles 206 (FIG. 8), configured to allow a user to remove or otherwise disengage the lid 154 from the cooking vessel 105. The handles 206 may be configured so as to have a low heat conductivity to protect a user's hands from burns.

In operation, a method of using the frying apparatus 100 according to the inventive concepts disclosed herein may include a user assembling the frying apparatus 100. In some exemplary embodiments, the various components of the frying apparatus 100 may be provided to a user as a kit. Referring again to FIG. 1, to assemble the frying apparatus 100, a user may assemble the stand assembly 102 by attaching the pan 110 to the base 106 and by connecting the gas conduit 128 to any desired source of fuel gas, such as a propane tank or a gas line. Desirably, the fuel gas source is coupled with the gas conduit 128 such that the valve 132 is positioned between the fuel gas source and the burner 126.

The cooking vessel 105 may be inserted into the cooking vessel base 142, and may be connected to the pan 110 via one of more locking connectors 169. Any desirable amount of cooking oil may be introduced in the cooking vessel (e.g., up to a marked or otherwise predetermined fill level). The seal member 152 may be positioned on the cooking vessel 105 (e.g., by being pressed onto the sidewall 162).

The food item support assembly 156 may be put together, for example by inserting the support rod 188 through the sidewall 180 of the lid 154 and/or through the vent 182, and by attaching the cable members 190 and/or the handles 198 to the support rod 188. A food item, such as a turkey may be attached to the food item holder 192, and the food item holder 192 may be attached to the cable members 190. The lid 154 may be inserted into the lid receiving channel 174 of the seal member 152.

The burner 126 may be ignited to heat up the cooking oil inside the cooking vessel 105 to a desired temperature (e.g., 350° F.). Once the desired temperature is reached, a user may apply rotational force to the handles 198 to lower the food item into the cooking oil. As will by appreciated by a person of ordinary skill in the art having the benefit of the instant disclosure, any cooking oil that could overflow onto the burner or splatter is now contained by the lid 154 and/or the seal member 152, and/or the pan 110, and is prevented from contacting the burner assembly 108. Any steam, and/or any hot gas are allowed to safely escape the lid 154, while the user is protected from splashing cooking oil via the splash screen 184.

An optional timer (not shown) may be used to time the desired cooking time for the food item. The user may observe the color of and/or the food item itself as it cooks via the transparent lid 154 in some exemplary embodiments.

Once the food item has been cooked, the user may shut off the burner 126, and may apply rotational force to the handles 198 to raise or lift the foot item out of the cooking oil. By selectively rotating a first handle 198 more than a second handle 198, the user may suspend the food item at an angle so as to allow for draining of the cooking oil from the food item. Once the cooking oil has drained from the food item, the user may separate (e.g., lift) the lid 154 from the cooking vessel 105 along with the food item, and may transfer the food item to any desired vessel or surface.

As will be appreciated by persons of ordinary skill in the art, the frying apparatus 100 and methods according to the inventive concepts disclosed herein minimize the chances of exposure to hot oil by the user as well as the potential disasters involved with lowering the food item, such as a turkey, by hand into the hot cooking oil. The turkey is brought up to a safe temperature by being placed in the lid 154 prior to heating the oil, which allows the turkey to gradually heat up as the cooking oil is preheating. Residual moisture remaining in the turkey may evaporate during the preheating of the cooking oil, and potentially incomplete thawing of the turkey is mitigated during the preheating stage, as heat from the oil rises into the lid 154 and preheats the turkey. The hot cooking oil is substantially contained by the lid 154 with to reduce the possibility of oil reaching the open flame or the user. The pan 110 keeps any displaced oil from reaching the burner assembly 108. The overflow channel 172 provides another oil containment safety feature. The burner 126 is substantially completely enclosed by the wind guard 136 and is positioned underneath the pan 110. Any overflowing or displaced cooking oil can no longer reach the burner 126. The cooking vessel 105 sits securely in the cooking vessel base 142 with one or more locking connectors 169 securing the cooking vessel 105 to the base 106. Further, the locking wheels 120 prevent the base 106 from tipping over by allowing the entire frying apparatus 100 to roll if bumped into. The valve 132 substantially eliminates overheating the cooking oil by adjusting the flame automatically based on cooking oil temperature. The valve may also put out the flame if a leak is detected and/or the cooking oil temperature exceeds a safe level (e.g., 350° F.). The 10-foot gas line allows greater distance between the fuel gas source and the base 106.

As will be appreciated by persons of ordinary skill in the art, at least one of, or one or more of the components of the frying apparatus 100, may be sold to users by itself, as a part of a kit to retrofit existing deep fryers, or as a partial or substantially complete kit to assemble a frying apparatus 100 according to the inventive concepts disclosed herein.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. A cover assembly for a cooking vessel having an upper rim, comprising:
    a seal member having a U-shaped clip portion with a internal leg and an external leg arranged so that the clip portion is positionable over the upper rim of the cooking vessel, a shoulder extending from the internal leg of the clip portion so as to define a lid receiving channel and an L-shaped lip extending from the external leg to define an overflow channel;
    a lid having a top end, a sidewall extending from the top end to cooperate with the top end to define an internal lid space and having a lower end defining an open bottom end, and a tube extending through the top end to form a vent, the lower end of the sidewall being receivable in the lid receiving channel of the seal member; and
    a food support assembly connected to the sidewall, the food support assembly comprising:
        a support rod having a first end rotatably connected to the sidewall at a first point and a second end rotatably connected to the sidewall at a second point diametrically opposed to the first point so that at least a portion of the support rod extends through the internal lid space;
        at least one flexible cable member having a first end and a second end, the first end being connected to the support rod in a way that the second end of the flexible cable member may be raised and lowered relative to the support rod in response to rotation of the support rod; and
        a food item holder connected to the second end of the flexible cable member such that the food item holder may be selectively moved between a raised position wherein the food item holder is supported within the internal lid space and a lowered position wherein the food item holder is supported below the seal member.

2. The cover assembly of claim 1, wherein the support rod is rotatably connected to the tube.

3. The cover assembly of claim 1, wherein the flexible cable member defines a first flexible cable member, wherein the food support assembly comprises a second flexible cable member having a first end and a second end, the first end being connected to the support rod in a way that the second end of the second flexible cable member may be raised and lowered relative to the support rod in response to rotation of the support rod, and wherein the food item holder is connected to the second end of the flexible cable member.

4. The cover assembly of claim 1, wherein the support rod has a first portion and a second portion being rotatable independently of one another, and wherein the first flexible cable member is connected to the first portion of the support rod and the second flexible cable member is connected to the second portion of the support rod.

5. The cover assembly of claim 1, further comprising at least one splash screen extending across the tube.

6. The cover assembly of claim 1, further comprising a temperature sensor for sensing the temperature of a content of the cooking vessel, the temperature sensor having a gauge mounted to the tube.

7. The cover assembly of claim 1, wherein the lid receiving channel of the seal member is positioned below the clip portion.

8. The cover assembly of claim 1, wherein the lid is transparent.

9. The cover assembly of claim 1, wherein the lid further comprises a cover pivotally attached to the tube so that the cover is selectively positionable over the vent.

10. A cover assembly for a cooking vessel having an upper rim, comprising:
    a lid having a top end, a sidewall extending from the top end to cooperate with the top end to define an internal lid space and having a lower end defining an open bottom end, and a tube extending through the top end to form a vent, the lower end of the sidewall being positionable on the rim of the cooking vessel; and
    a food support assembly connected to the sidewall, the food support assembly comprising:
        a support rod having a first end rotatably connected to the sidewall at a first point and a second end rotatably connected to the sidewall at a second point diametrically opposed to the first point so that at least a portion of the support rod extends through the internal lid space;
        at least one flexible cable member having a first end and a second end, the first end being connected to the support rod in a way that the second end of the flexible cable member may be raised and lowered relative to the support rod in response to rotation of the support rod; and
        a food item holder connected to the second end of the flexible cable member such that the food item holder may be selectively moved between a raised position wherein the food item holder is supported within the internal lid space and a lowered position wherein the food item holder is supported below the seal member.

11. The cover assembly of claim 10, wherein the support rod is rotatably connected to the tube.

12. The cover assembly of claim 10, wherein the flexible cable member defines a first flexible cable member, wherein the food support assembly comprises a second flexible cable member having a first end and a second end, the first end being connected to the support rod in a way that the second end of the second flexible cable member may be raised and lowered relative to the support rod in response to rotation of the support rod, and wherein the food item holder is connected to the second end of the flexible cable member.

13. The cover assembly of claim 10, wherein the support rod has a first portion and a second portion being rotatable independently of one another, and wherein the first flexible cable member is connected to the first portion of the support rod and the second flexible cable member is connected to the second portion of the support rod.

14. The cover assembly of claim 10, further comprising at least one splash screen extending across the tube.

15. The cover assembly of claim 10, further comprising a temperature sensor for sensing the temperature of a content of the cooking vessel, the temperature sensor having a gauge mounted to the tube.

16. The cover assembly of claim 10, wherein the lid is transparent.

17. The cover assembly of claim 10, wherein the lid further comprises a cover pivotally attached to the tube so that the cover is selectively positionable over the vent.

* * * * *